Aug. 30, 1932.  R. H. GRIER ET AL  1,875,304
APPARATUS FOR SHAPING SHOES
Filed Aug. 27, 1930   3 Sheets-Sheet 1
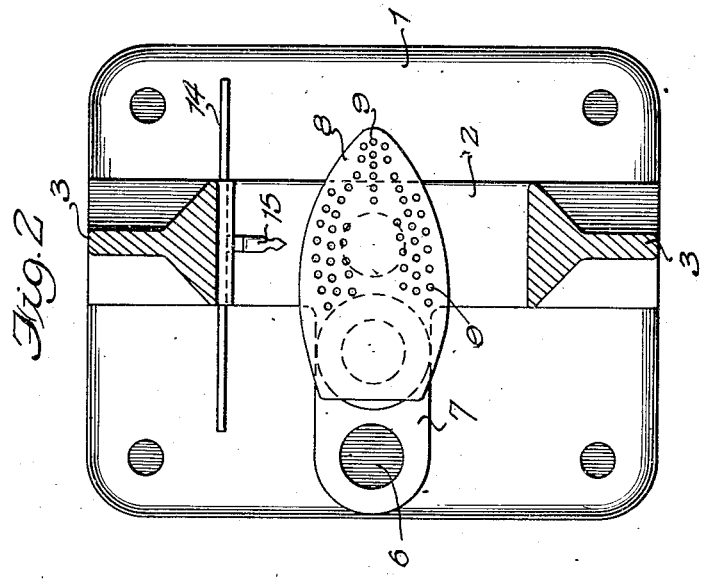
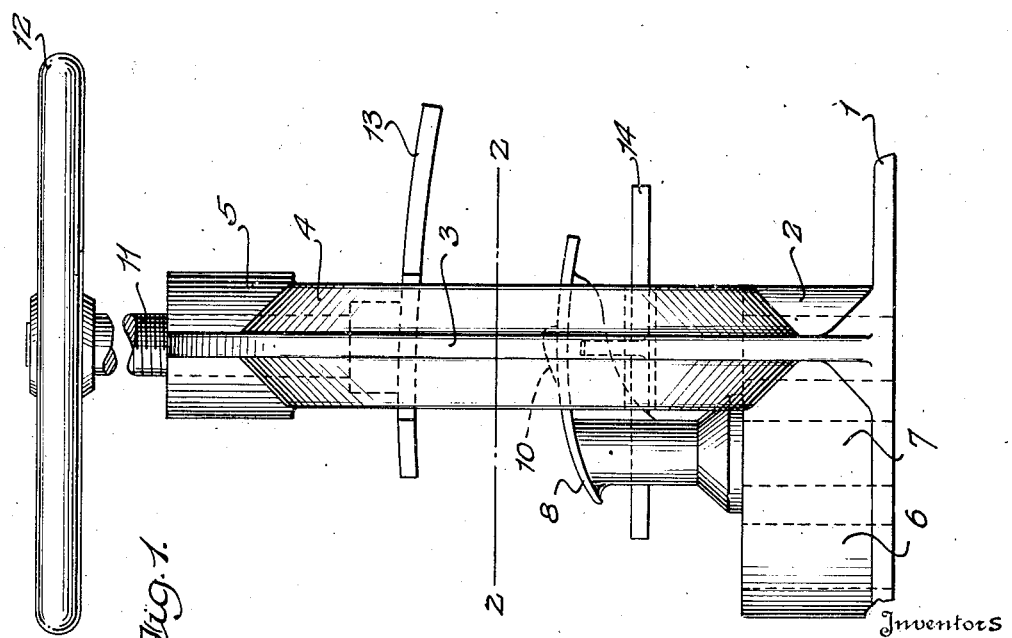
Inventors
RALPH H. GRIER and
A. SACHS
By Albert Grobstein
Attorney Aug. 30, 1932.   R. H. GRIER ET AL   1,875,304
APPARATUS FOR SHAPING SHOES
Filed Aug. 27, 1930   3 Sheets-Sheet 2

Inventors
RALPH H. GRIER and
A. SACHS.
By Albert Grobstein
Attorney

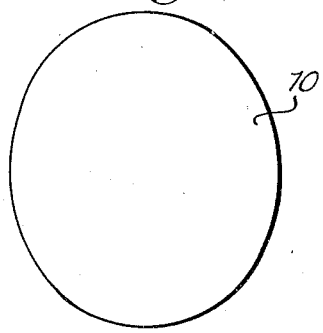
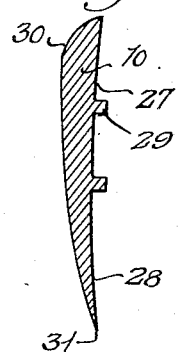
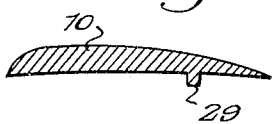
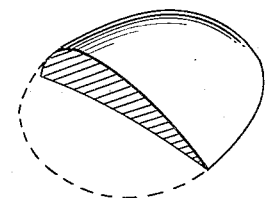
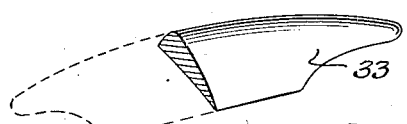
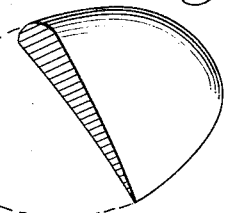
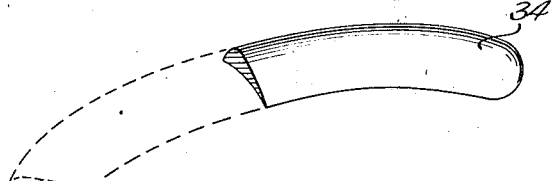
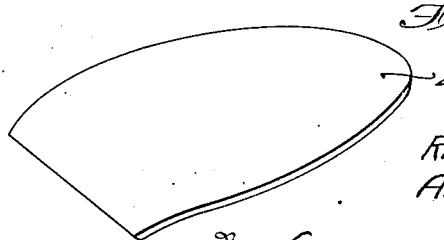
Inventors
RALPH H. GRIER and
A. SACHS.
By Albert Grobstein
Attorney Patented Aug. 30, 1932

1,875,304

UNITED STATES PATENT OFFICE

RALPH H. GRIER AND ABRAHAM SACHS, OF SALISBURY, MARYLAND, ASSIGNORS TO SACHS SOLE SHAPING MACHINE COMPANY, INCORPORATED, A CORPORATION OF MARYLAND

APPARATUS FOR SHAPING SHOES

Application filed August 27, 1930. Serial No. 478,205.

This invention relates to an apparatus and process for breaking in shoes which may be applied to new shoes so that they may be deformed to comfortably fit the purchaser, or to old shoes which have been worn out of shape and in which restoration is desired.

The invention has for its object the provision of a novel apparatus and accessories thereto together with a novel process, all of which comprises a standard or base having an anvil adjustably supported thereon, said anvil having a plurality of openings therein, a series of mold members each of which is provided with one or more pins adapted to enter said openings in the anvil, said mold members having a special receding convex-plano working surface, a special sole restoring mold member, a special heel-counter densifying member, means for applying pressure in a single direction substantially perpendicular or normal to the plane of the surface of the anvil so that such mold members may be forced into engagement with an inner surface of the shoe to deform or restore the same to a predetermined contour, an adjustable marking device for accurately denoting the desired points for placing the molds on the anvil; all of which is more fully hereinafter described and claimed.

In the prior art, it has been proposed to break in shoes to fit a prospective purchaser by stretching the upper of the shoe by means of various stretching devices. Such an operation has resulted in deforming the shape of the upper, damaging the connecting structure of the upper and sole by tearing the same apart, distorting the grain of the leather, and generally altering the beauty and original design of the shoe. This stretching operation, moreover, has failed to accomplish the desired results for the reason that the shoe bottom or insole has remained substantially unaltered, which was still uncomfortable to a purchaser who may have callouses, or other foot deformities.

It has also been proposed to break in shoes by kneading and stretching a shoe insole by a rolling pressure. This latter proposal has been unsuccessful for the reason that the rolling, kneading and stretching has wrinkled and crumpled the shoe bottom, thus destroying the cementing and attachment of the insole layers and the outer sole; furthermore, the rolling and kneading operation has prevented any accuracy in predetermining a point at which a depression was desired. A further disadvantage of such prior operation lay in the fact that rolling pressure was supplied in more than one direction and at an oblique angle to the shoe bottom, thus causing the filler to lump up and become uncomfortable and to push out and spread the leather, which disturbed the leather fiber and damaged the exterior appearance. The softening of the shoe bottom by such prior kneading also led to early crumpling of the filler and insole. In addition to all of these disadvantages, the apparatus for rolling and kneading a shoe sole was so intricate and expensive, having a large number of complex parts with frequent disarrangement and consequent inoperativeness, that it was long ago discarded as impracticable for commercial use.

We have discovered that when a wearer breaks in a shoe to ultimately conform to the special deformities in his foot, that the shoe is densified at certain predetermined points and that such densification takes place by pressure exerted in a single direction perpendicular to the plane of the shoe bottom. We have further discovered that those people who shuffle their feet are the most prone to cause irregularities on the inner sole such as wrinkling, etc. These observations led us to experiment to reproduce, as closely as possible, the condensation or densification of the shoe sole by a person during correct walking action. We have discovered that by densifying a sole by the application of direct pressure in a single direction substantially normal to the plane of the sole, that hardening of the sole takes place at the densified points, thereby resulting in increased wear of the shoe in the places which normally wear out the quickest; together with attendant advantages of having the shoe comfortably conform to the foot of the wearer.

We have further discovered that by using specially designed mold members, the working surfaces of which are what might be termed convexly-receding-plano to a feathered edge, and applying pressure thereto without any kneading or rolling motion, the deformations on the shoe bottom are regular without any bumps or sharp points and that the wearer is agreeably surprised with the comfort obtainable in an unworn shoe. It has been our experience that by applying such pressure on the molds as indicated, no substantial distortion or creeping of the filler and insole takes place with respect to the bottom sole, no damage to the cement or tacking of such layers occurs, and special shaped deformities may have their contours quickly and accurately formed in the shoe interior at an exceedingly low cost and without marring the beauty and design of the shoe as originally intended by the manufacturer.

The preferred embodiment of our invention is indicated in the accompanying drawings, in which:

Figure 1 is a view in elevation showing the anvil supported on a base, a mold on the anvil, and means for applying pressure in a direction substantially normal to the surface of the anvil.

Figure 2 is a plan view of the apparatus taken along the line 2—2 of Figure 1, also showing the adjustabe indicating device.

Figure 7 is a longitudinal cross-section of one of the convexo-receding-plano molds.

Figure 8 is a plan view of the working surface of the mold shown in Figure 7.

Figures 9, 10, 11, 12 and 13 are modified forms of the mold shown in Figures 7 and 8.

Figures 14, 15 and 16 are views of molds which are convexo-receding-plano in shape adapted to densify the marginal edge of an inner sole.

Figure 17 is the view of a mold having a substantially smooth and slightly curved surface for restoring a sole, as shown in Figure 4.

Figure 19:
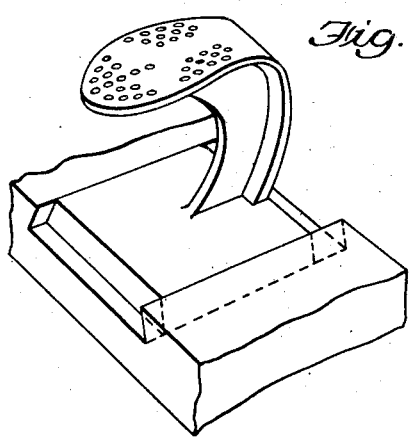
Figure 19 is a view showing a modification wherein the anvil is made adjustable by a sliding arrangement on the supporting base.

Referring to Figures 1 and 2, the base 1 with the anvil support 2 mounted on the same, has cast integrally therewith the upwardly extending parallel arms 3 which are joined together at the top by an arch-like portion 4 having in the middle of same the screw-retaining member 5. The base 1, anvil support 2, arms 3, arch portion 4 and screw-holding member 5 are all preferably cast integrally in one piece, although the various elements may be obviously assembled otherwise. The anvil-supporting member 2 has a plurality of vertical cylindrical sockets 6 in which the anvil spindle 7 is adapted to be removably adjusted, thereby supporting the anvil 8 in any desired position. The anvil-supporting element 2 may be made operable and adjustable in a sliding groove and guide, in accordance with the modification as shown in Figure 19. The anvil 8 is provided with a plurality of openings 9 in which mold members 10 having pins thereon are adapted to be positioned. The screw-supporting element 5 has an internal bore provided with female thread to receive the male thread of the screw shank 11 having a hand wheel 12 associated therewith for applying pressure. The shank 11 is joined to pressure plate 13 by a swivel connection, thus permitting direct pressure in a single direction to be applied to the anvil by rotation of the hand wheel 12. The indicating scale 14 is mounted horizontally, on an arm 3 and has slidable thereon the pointer 15.

In operation, the anvil 8 with spindle 7 is inserted in one of the anvil supporting sockets 6, a mold 10 is properly positioned on the anvil by placing a pin or pins of the same in one or more openings 9, the pointer is moved by sliding the same upon the scale 14 to a point opposite the middle line of the mold, the shoe is placed on the anvil in a position indicated by the set pointer, and then direct pressure is applied in a downward direction substantially perpendicular to the plane of the anvil, thus densifying the interior of the shoe to the desired degree at a predetermined point.

Figure 6:
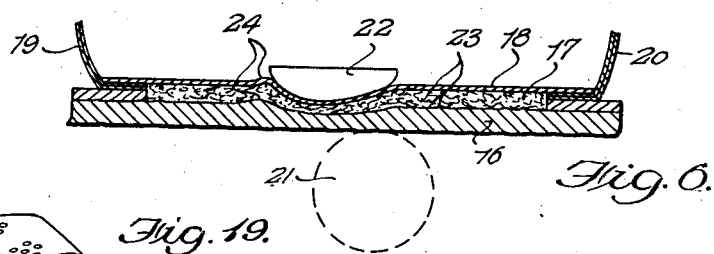
Figure 6 is a section of a shoe bottom to which rolling or kneading pressure has been applied.

Referring to Figure 6, the numeral 16 represents a bottom shoe sole, 17 represents a filler therein, while 18 is the insole proper extending over the fabric lining 19 of the upper leather 20. This indicates the action which takes place when rolling and kneading pressure is applied, the roll 21 and button 22 coacting to produce a wrinkling and separation of sole, filler and insole with attendant creeping and humping as shown at 24.

Figure 5:
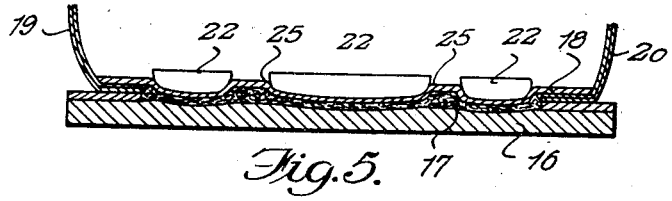
Figure 5 is a section of a shoe bottom illustrating the sharp points and irregularities produced by molds which do not have a receding-plano surface.

Referring to Figure 5, the deficiencies attendant upon the use of molds 22 having regularly curved working surfaces is indicated. Even though a single direct pressure is applied in this example, it will be seen that sharp humps 25 are defined on the shoe insole. Although this form is workable without the destructive influences attending the working shown in Figure 6, it is not entirely desirable.

Figure 3:
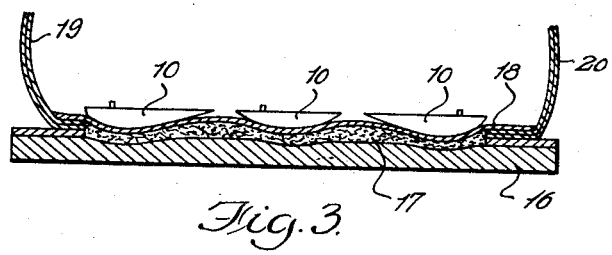
Figure 3 is a view showing in section the bottom of a shoe having applied thereto by direct pressure the special shaped convex-receding-plano molds.

The view shown in Figure 3 represents the shoe structure which results from the proper application of our invention and in which the molds used are convexo-plano receding to a substantially feathered edge, the pressure having been applied at the desired predetermined points in a direction substantially perpendicular to the shoe bottom. The shoe structure is densified at the proper places, as desired, without distorting or destroying the relative arrangement of insole, filler and shoe bottom, and without causing wrinkles, humps and sharp angles to vex and discomfort the wearer.

Figure 4:
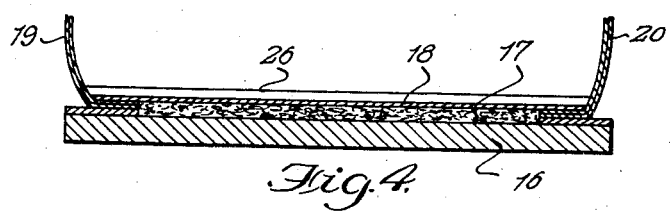
Figure 4 shows a section of a shoe bottom which has been restored to an original condition.

Figure 4 shows the shoe structure in restored position after the restoring plate 26 shown in Figure 17 has been applied under pressure to a wrinkled insole.

Referring to Figure 7, the mold 10 has an almost flat surface 27 slightly curved at 28 to fit flush with the shoe last surface 8 when the pins 29 are inserted in openings 9 (see Figure 2).

The working surface of the mold 10 is substantially convex in curvature at one end of the mold as at 30 and then recedes in a substantial plane to form a feathered edge at 31 with the bottom mold surface 28. Figure 8 shows the outline of mold 10 of Figure 7 to be substantially elliptical, while Figures 9, 10, 11, 12 and 13 show modifications having various degrees of curvature and various shades of recession from the most prominent arcuate portion to the oppositely disposed feathered edge.

In Figures 14, 15, 16, I have shown respective molds 32, 33 and 34 which are adapted for use along the edge of the insole. It will be noted that each of these molds has a cross-section similar to the section of the molds shown in Figures 7, 9, 10, 11, 12 and 13. The restoring plate 26 shown in Figure 17 has pins on its under surface (not shown) and is designed to fit flush with the last surface.

Figure 18:
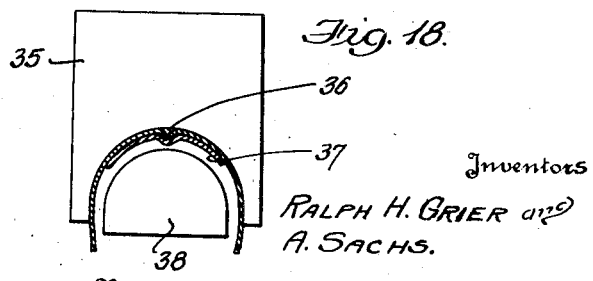
Figure 18 is a view showing the ironing out and densifying of a heel-counter.

In Figure 18, densifying of the heel counter is shown by applying pressure to the plate 35 bearing upon the seam 36 outside of the shoe, thru the heel pad or lining 37 onto the special heel mold 38. This obviates the disadvantages arising when a shoe salesman attempts to "soften" a counter by bending the same back and forth and thus destroys the shape of the heel without correcting the difficulty. The ironing out of the heel of the shoe by densification, leaving the same smooth and properly shaped, is also a feature of our invention.

In Figure 19 is shown a sliding arrangement for the anvil 8, whereby the same is adjustable to a finer degree than by the socket limitations shown in Figure 2.

Ordinarily, in the practice of our invention, after a shoe purchaser selects the style of shoe desired, he is fitted with the most suitable size and any foot deformities, such as callouses, bunions, corns, or deformed joints are carefully noted with regard to his wornout shoes or upon visual inspection of his foot. Generally speaking, we have found that by densifying a shoe insole $\frac{1}{16}$ inch we can increase the shoe a half-size in the place where the deformity occurs and where most needed. We, therefore, mark the shoe at a point or points to be densified, and then select a mold which represents the deformity and place the same upon the last in a position corresponding to the marking. The pointer 15 is adjusted to the mold position and the shoe is then placed over the mold until its mark and the pointer 15 correspond, thus indicating the correct place of densification. Pressure is applied by the hand wheel 12 until the desired densification takes place. In the case of shoes which wear improperly, it will often be observed that wrinkling of the lining over the cork or paper filler occurs, or the filler lumps up and becomes uncomfortable, in which case we bring the insole back to normal by use of the plate 26 shown in Figure 17, by the application of pressure thereto. It will also be observed in worn shoes that the inside margin of the insole tends to curl up to the discomfort of the wearer. This condition is obviated and corrected by applying mold 34 on the last margin and applying direct presssure thereto.

It will be seen that we have provided a simple, inexpensive method and apparatus for breaking in unused shoes. By our method and apparatus, we do not push out or spread the leather by any stretching, rolling or kneading operation, but on the contrary, we densify by pressure so that no substantial creeping takes place, thus increasing the comfort and life of the shoe without destroying the shape and beauty of the same, and eliminating sole squeaks, wrinkling linings, broken counters and a host of other ills which have hitherto been considered impossible to avoid.

While we have described a series of molds to be positioned on a last by means of pins or equivalent means permitting suitable adjustment, it is apparent that the invention may be practiced by casting our molds directly integral with a series of anvils, and using a separate anvil for each individual deformity.

By our invention, we have overcome prior difficulties and have efficiently provided a satisfactory method and apparatus which we consider to be forward steps in the art and represent contribution to human comfort and economy. We believe that we are the first in the art to discover that shoe correction should take place at accurately predetermined areas; that correcting molds should be used which accurately correspond to the specific foot deformities; and that hardening or densifying of predetermined areas increases wear together with comfort.

What we claim, is:

1. An apparatus for shaping shoes comprising a press having a support and arms, an anvil for densifying areas of an insole adjustably carried on the support between the arms, a plurality of openings in the anvil, a mold having a convexly shaped working surface, the body of the mold being thick in cross-section abruptly rising to its peak adjacent one edge of the same and tapering down to a thin feathered opposite edge, whereby the peak is offset relative to the geometrical center of the mold, pin means on the mold engaged in the anvil openings, the arrangement being such that a shoe interior may be densified at a predetermined place by placing the same on the anvil over the mold and operating the press to contact the shoe interior with the mold.

2. In combination with an anvil element for densifying areas of an insole, an insole densifying mold having a convexly shaped working surface, the body of the mold being thick in cross-section abruptly rising to its peak adjacent one edge of the same and tapering down to a thin feathered opposite edge, whereby the peak is offset relative to the geometrical center of the mold.

3. In combination with an anvil for densifying areas of an insole, an insole mold having pin means on its bottom surface for engagement with an anvil, said mold having a convexly-shaped top working surface, the body of the mold being thick in cross-section abruptly rising to its peak adjacent one edge of the same and tapering down to a thin feathered opposite edge, whereby the peak is offset relative to the geometrical center of the mold.

4. A structure as set forth in claim 2 in which the mold is a permanent part of the anvil element.

In testimony whereof, we hereunto affix our signatures.

RALPH H. GRIER.
ABRAHAM SACHS.